W. A. BURNHAM.
MONEY CHART.
APPLICATION FILED JUNE 5, 1917.
1,260,963.
Patented Mar. 26, 1918.
2 SHEETS—SHEET 1.
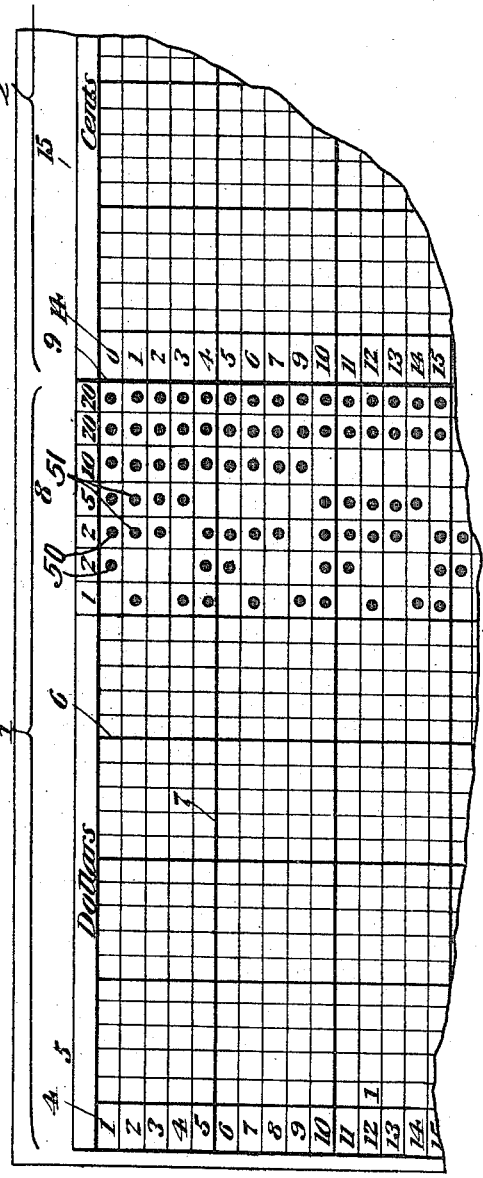
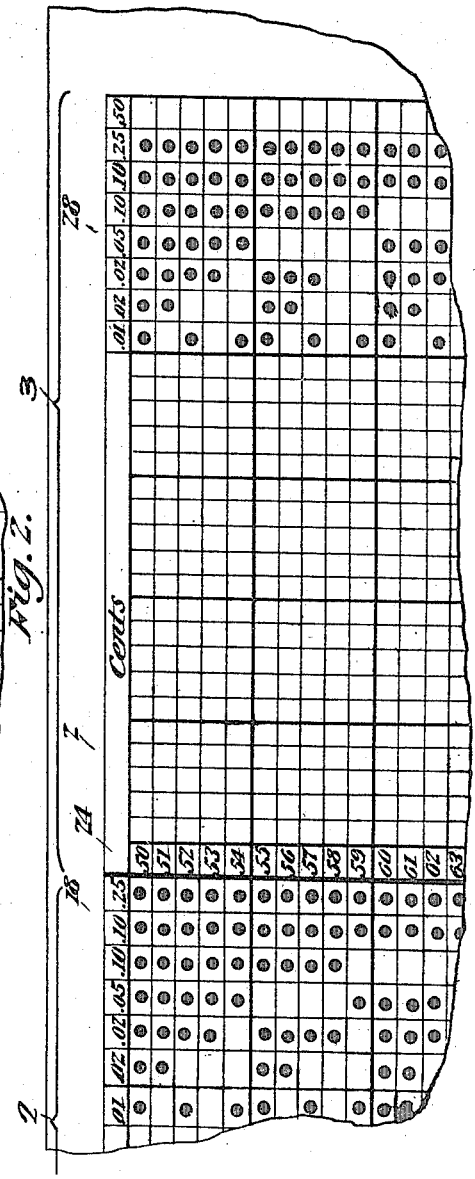
WITNESSES
INVENTOR
W. A. Burnham
BY Victor J. Evans
ATTORNEY W. A. BURNHAM.
MONEY CHART.
APPLICATION FILED JUNE 5, 1917.
1,260,963.
Patented Mar. 26, 1918.
2 SHEETS—SHEET 2.
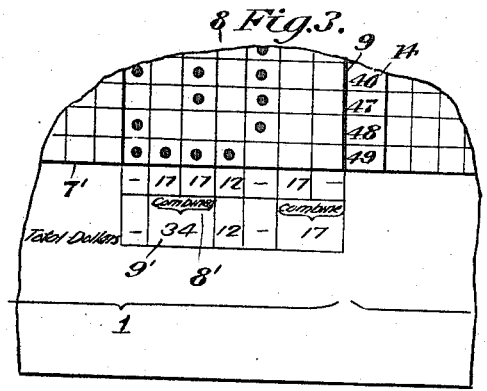
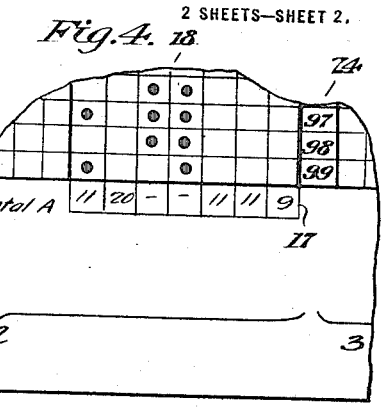
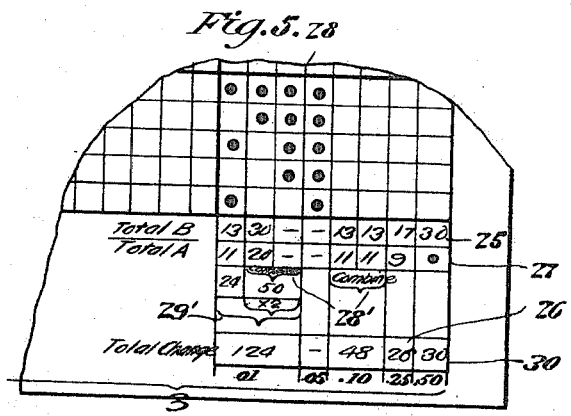
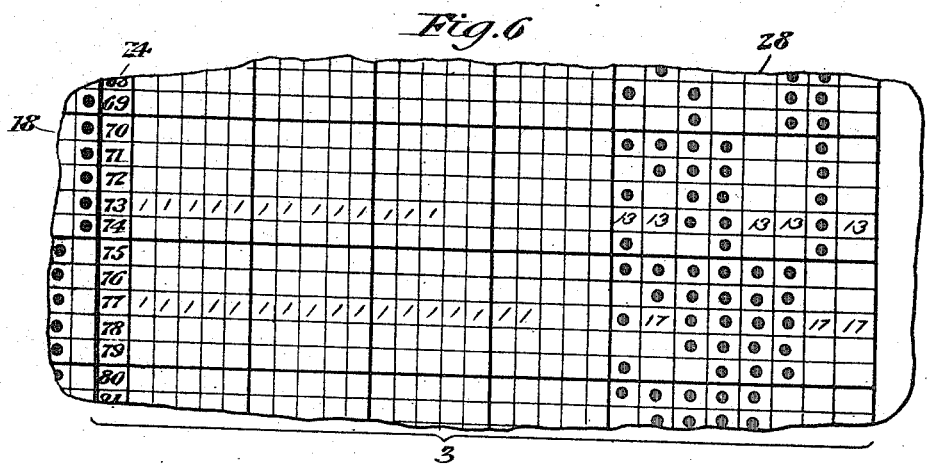
WITNESSES
INVENTOR
W. A. Burnham
BY Victor J. Evans
ATTORNEY

UNITED STATES PATENT OFFICE.

WALTER A. BURNHAM, OF SOMERVILLE, MASSACHUSETTS.

MONEY-CHART.

1,260,963. Specification of Letters Patent. Patented Mar. 26, 1918.

Application filed June 5, 1917. Serial No. 173,012.

*To all whom it may concern:*

Be it known that I, WALTER A. BURNHAM, a citizen of the United States, residing at Somerville, in the county of Middlesex and State of Massachusetts, have invented new and useful Improvements in Money-Charts, of which the following is a specification.

This invention relates to calculators, and more especially those which are tabular and in sheet form; and the object of the same is to produce a money chart from which and by the use of which a paymaster in making up his pay-roll may inform himself in advance how many pieces of money of the various denominations he needs, such as twenty-dollar bills, ten-dollar bills, twos and ones, and the various coins for the fractional currency.

Incidentally, by the use of this money chart the paymaster also establishes a check upon himself so as to ascertain what is the aggregate he needs to draw from the treasurer for any given pay-roll.

As a further incident to my invention, a check is provided so that the money chart may be inspected by a proper officer—if one exists—so as to check it up and furnish a voucher, giving the paymaster authority to draw the aggregate from the treasury, in case the rules of the establishment require.

The invention consists, broadly speaking, in a sheet calculator in the form of a money chart ruled in rows and columns and blocked into divisions for the dollars and the cents—all as hereinafter more fully described and claimed and as shown in the drawings wherein:—

Figure 1 is a plan view of the upper left-hand corner of the chart, and Fig. 2 a similar view of the upper right-hand corner.

Fig. 3 is a plan view showing the lower end of the money or computing colums of the dollars division, Fig. 4 a similar view of the computing columns of one-half of the cents or the smaller cents division, and Fig. 5 a similar view of the other or larger half of the cents division and the footings of all the divisions.

Fig. 6 is a plan view of a portion of the larger cents division, showing the use of the money chart as will be explained below.

In full size this chart will measure about twelve inches high and twenty-four inches wide, and it cannot well be illustrated complete on the drawings, but the above views are believed to be sufficient to give a clear understanding.

This chart as a whole may be printed or otherwise inscribed on paper sheets, and when one sheet is used it is thrown away and another employed the following week or pay day; or if a permanent form of chart is used, it may be printed on celluloid or the like, and the pencil marks thereon erased after use, by employing a rubber or a wet sponge or the like. I do not wish to be limited in this respect, and no illustration is seen to be necessary. For ordinary purposes I print the chart in three divisions, the one to the left being for dollars and on a chart of about the size suggested capable of working on salaries from one dollar a week up to fifty dollars; and the remaining two divisions being for cents, the second division being from no cents up to forty-nine, and the third division from fifty cents up to ninety-nine. Also the chart herein shown and described is capable of computing the money to be paid to twenty employees or less who draw the same salary per week (or other period), but in respect of its capacity in both these particulars I do not wish to be limited and it is obvious that the capacity would be increased by making the chart larger, or the reverse.

The first division is numbered 1, and Fig. 1 shows its upper end and the upper end of the second division, numbered 2. The first division is ruled vertically into columns, whereof the first column 4 bears numbers progressively increasing downward from 1 to 50, and Fig. 1 shows only about fifteen of these numbers. They indicate various weekly wages, and I will call this the "wage column" 4. To the right of this column are what I will call check columns 5, shown in Fig. 1 as divided in groups of five by heavy upright lines 6 at regular intervals, and also heavy lines 7 are drawn transversely through the division under the $5.00 and $10.00 wages, and so on: in other words the face of the paper is ruled into individual blocks by fine lines, and divided by heavy lines 6 and 7 into groups containing twenty-five blocks each, as is usual with architectural and topographic paper ruling. Fig. 1 shows four of the groups of check columns 5 to the right of the wage column 4. Yet to the right of the check columns are money or computing columns 8 appropriately headed by figures indicating one dollar, two dollars, two dollars, five dollars, ten dollars, twenty dollars, and twenty dollars; or in other words there are two two-dollar columns and two twenty-dollar columns, while there is only one column each of the one dollar, five dollar and ten dollar denominations. To the right of the money columns 8 is a heavy division line 9 separating everything in the first division 1 from the second division 2. I might here remark that, if desired, this division could be on a separate chart, or perhaps the second and third divisions for cents could be on one sheet, and the other division or divisions for the dollars (for the dollars could run beyond the fifty as suggested above) might be on another sheet. But in the illustration herewith, all three divisions are supposed to be on one sheet.

The second division is inscribed in much a similar way. The first or wage column 14 is numbered 0, 1, 2, 3, 4, etc., to 49; then follow the check columns 15 grouped in blocks of twenty-five squares each as already described; and then follow seven money columns 18 appropriately headed excepting that these are for cents instead of dollars as in the money columns 8. Reference for details is made to Fig. 2. The third division 3 is amost exactly identical with the second division excepting that the first or wage column 24 reads downward 50, 51, 52, 53, 54, etc., to 99 cents. Its money columns are the exact duplicate of the money columns 18 as to the lines and the heading, but I have numbered them 28, and details appear in Fig. 2.

The footings of the dollars money columns appear in Fig. 3. The upright lines are carried below the lowermost heavy line 7', and squares are provided for the individual column totals. Braces 8' connect the two two-dollar columns and the two twenty-dollar columns, and are marked with the words "Combine" and beneath these braces and beneath the footings for the other columns are spaces 9' for totals as will yet be explained. Fig. 4 shows the footings of the money columns of the second division, and these need no braces. Fig. 5 shows the footings of the third division which may be described as follows: The totals of the money columns 28 are brought down on the first row at 25. The totals of the money columns 18 shown at 17 in Fig. 4, are placed in the second row 27 in Fig. 5 beneath the first row totals at 25. Beneath the second row are two braces 28', and beneath the first brace and the first money column is another brace 29'. Yet beneath all braces and all columns is the third or last row 30, opposite which may occur the words "Total change." I might say in closing that the lines employed to produce the columns and rows are spaced about a quarter of an inch apart in the samples I have made, with good results; but it is obvious they could be closer together and the chart could be used without confusion or difficulty, especially if instead of heavier lines at 6, 7, and 9, colored lines were used or other means adopted to permit the operator to carry his eye transversely along a row or vertically along a column without confusion. However, the matter of proportions is not essential to this invention.

The use of this device is as follows: The paymaster in a large establishment must know how many bills of each denomination he is to need at pay day, and how much fractional currency of each denomination is required, for obviously he can not stop to make change if his custom is to pay out the bare cash, and he must have the exact change if his custom is to pay by means of envelops. Assuming that an employee is to receive a wage of $12.73: it is obvious that the paymaster must have one ten-dollar bill, one two-dollar bill, a fifty-cent piece, two dimes, and three pennies; and all these he must have whether he hands the employee the cash or puts the total in an envelop and hands out the envelop. Another employee who may draw an even wage of $20.00 can be paid off with a twenty-dollar bill or two ten-dollar bills. In the use of this money chart, the paymaster takes up the question of each employee separately and marks the chart with the various pieces of money to pay him what is required. For the sum of $12.73 as suggested, he would make a mark in the first check column 5 and in the row opposite the number 12 which is printed in the wage column 4; and then he would make a similar mark in the first check column and in the row opposite the number 73 in the wage column 24 of the third division. Then taking up the matter of the next employee, he would follow the same plan. If this also happened to be an employee who received the same wage, he would make a mark in the second check column, and in position immediately following the mark already made, both for dollars and cents. As an illustration, Fig. 6 shows thirteen such marks made opposite the printed number indicating 73 cents, and seventeen opposite the printed number indicating 77 cents. With the check columns ruled in four groups of five columns each, this sheet has a capacity for thus indicating twenty employees whose dollars are the same or whose cents are the same in their weekly wage. Thus the paymaster goes through his roll with the money sheet until the wages of all employees have been checked in the check column.

I now invite attention to the particular blocking out of certain squares shown in the several money columns. Taking for instance Fig. 1, black dots or "blocks" 50 are shown beneath both of the twos, the five, the ten, and both of the twenties, leaving only a clear space under the one, and it will be observed that this occurs opposite the numeral 1 in the wage column 4. This means that a $1 wage may be paid with one one dollar bill. In the next line similar blocks or dots 51 occur in every square excepting that beneath one of the twos, and this occurs opposite the numeral 2 in the wage column 4. In the third row only the two spaces are vacant which are beneath one two and the one, which added together make up three dollars opposite the numeral 3 in the wage column 4. Thus in all cases the sum total of the unoccupied squares is equal to the amount of money indicated in the wage column opposite: in other words, all squares are blocked out which are not used. The result is that while the ruling in the money columns extends from top to bottom, the blocks interrupt or destroy such squares in any horizontal row as are not necessary for computing purposes. Or to state it yet differently, the unblocked squares make up an aggregate total which is equal to the money in the wage column opposite, and this is the case in all divisions of the chart.

After the paymaster has inserted the checks as above described, he adds those in each row from left to right and marks the total number of checks in all of the unblocked squares of the money columns to the right, as seen in Fig. 6. Thus the thirteen employees who receive 73 cents will, in order to be paid off, have to have thirteen pennies, thirteen two-cent pieces if the paymaster could secure them, thirteen dimes twice or twenty-six dimes, and thirteen fifty cent pieces. The same view shows that the seventeen employees who receive seventy-seven cents each will require seventeen two-cent pieces, or thirty-four pennies, seventeen quarters, and seventeen fifty-cent pieces. Fig. 5 shows the footings, the totals shown being for illustration only, the individual units composing them not appearing in the drawing. The paymaster next adds each row vertically. As the second and third rows in Figs. 1 and 3 are both $2.00 units, he combines them as called for by the brace 8' and puts their sum in the space 9'. So also with the last two rows. Fig. 4 shows at Total A the footings of the cents from 0 to 49. Fig. 5 shows at Total B the footings for the last money columns. The first row 25 shows the footings from 50 cents to 99 cents. Then the paymaster brings over in the second row 27 the Total A footings from the row 17 of Fig. 4. Now as required by the several braces 28' and 29' he brings down the duplicates, and condenses them and adds them, so that the third or last row 30 gives him the total change required to pay off his men. Therefore he knows from the footings in Fig. 3 what are the total dollars and the several denominations of bills, and he knows from Fig. 5 in its last row 30 what is the total change and what are the several denominations of coins that he must draw from the paymaster that week. As suggested above, he can add the dollars total to the change total and check it up with his pay roll; or if there be an auditor, this money sheet can be checked by the auditor to permit the paymaster to draw the aggregate, as the grand total must conform with the total wages paid out that week.

What is claimed as new is:—

1. A calculator of the class described comprising a sheet ruled in transverse rows and upright columns and inscribed as follows: the first column being progressively numbered from top to bottom, several columns next to the right being blank for the reception of check marks, the remaining columns to the right being headed respectively with indicia designating pieces of money of different denominations, and in each row across the last-named columns all squares being blocked out excepting that or those beneath indicia whose aggregate equals the number in the same row, leaving each unblocked square for a figure indicating the total checks in that row, for the purpose set forth.

2. A pay-roll calculator comprising a sheet inscribed with an upright row of numbers denoting wages and ruled with horizontal and vertical lines to produce squares in transverse rows and upright columns headed respectively with figures denoting pieces of money of several denominations, and in each row across the designated columns all squares being blocked out excepting such as occur in columns headed with figures whose sum equals the wage number in the same row, leaving each unblocked square for a figure indicating the total employees receiving the wage opposite for the purpose set forth.

3. A pay-roll calculator comprising a sheet inscribed with an upright row of numbers in progressive order denoting wages, the sheet having a checking space adjacent and also being ruled adjacent such space with columns headed respectively with figures designating different pieces of money of several denominations; and opposite each wage, the sheet being marked with blocks in all columns excepting those having head figures whose sum equals such wage, leaving the unblocked spaces in the columns for figures each giving the total checks opposite said wage, for the purpose set forth.

In testimony whereof I affix my signature.

WALTER A. BURNHAM.

Copies of this patent may be obtained for five cents each, by addressing the "Commissioner of Patents, Washington, D. C."